United States Patent [19]

Yokota et al.

[11] Patent Number: 4,521,787

[45] Date of Patent: Jun. 4, 1985

[54] INK JET RECORDING HEAD

[75] Inventors: Masami Yokota, Hiratsuka; Hiroshi Sugitani, Machida; Tadayoshi Inamoto, Hiratsuka, all of Japan

[73] Assignee: Canon Kabushiki Kaisha, Tokyo, Japan

[21] Appl. No.: 502,687

[22] Filed: Jun. 9, 1983

[30] Foreign Application Priority Data

Jun. 18, 1982 [JP] Japan ................................ 57-103723

[51] Int. Cl.³ .............................................. G01D 15/16

[52] U.S. Cl. ................................................ 346/140 R

[58] Field of Search .............................. 346/140 R, 75

[56] References Cited

U.S. PATENT DOCUMENTS 4,330,787 5/1982 Sato et al. ........................ 346/140 R 4,437,100 3/1984 Sugitani et al. .................. 346/1.1 X

*Primary Examiner*—E. A. Goldberg

*Assistant Examiner*—Gerald E. Preston

*Attorney, Agent, or Firm*—Fitzpatrick, Cella, Harper & Scinto

[57] ABSTRACT

An improved ink jet recording head is provided which comprises a substrate, and a cured film of a photosensitive resin for the formation of ink pathways and a covering over said pathways. Said covering comprises a flat plate made of a UV-light transmissive material having a photosensitive resin film adhered on both surfaces thereof. This ink jet recording head is precise, reliable and durable.

6 Claims, 7 Drawing Figures

INK JET RECORDING HEAD

BACKGROUND OF THE INVENTION

1. Field of the Invention

This invention relates to an ink jet recording head, and more particularly to an ink jet recording head for generation of small droplets of ink to be used for an ink jet recording system.

2. Description of the Prior Art

Ink jet recording heads to be applied for ink jet recording systems are generally provided with minute ink discharging outlets (orifices), ink pathways and an ink discharging pressure generating portion provided on a part of the ink pathway.

In the prior art, as the method for preparing such ink jet recording heads, there has been known, for example, the method in which minute grooves are formed on a plate of glass or metal by cutting or etching and then the plate having the grooves is bonded with an appropriate plate to form the ink pathways.

However, in the head prepared by such a method of the prior art, there may be formed too much roughness of the internal walls of lhe ink pathways worked by cutting or may be formed distortions due to the difference in etching degree, whereby ink pathways with good precision can hardly be obtained and the ink discharging characteristics of the ink jet recording heads thus prepared are liable to fluctuate. Also, chipping or cracking of the plate is liable to occur during cutting work to give a disadvantageously poor yield of the production. And, in etching work, a large number of production steps are involved leading to a disadvantageous increase of cost. Further, as the drawback common in the preparation methods of the prior art as mentioned above, during lamination of an engraved plate having formed ink pathway grooves and a cover plate having driving elements such as piezoelectric elements, and heating elements for generating energies for ink jet, the precise adjustment of their mutual position is difficult, thus failing to afford mass-production.

As a new method for producing ink jet recording heads which can overcome these drawbacks, there has been proposed a method for the production of ink jet heads in which ink pathway walls are formed from a cured film of a photosensitive resin on a substrate provided with ink discharging pressure generating elements, and thereafter a covering is provided over said ink pathways, as disclosed in Japanese Laid-open Patent No. 43876/1982.

The ink jet recording head manufactured with the cured film of a photosensitive resin is excellent in that it overcomes the drawbacks in the ink jet recording head of the prior art, namely insufficient precision of the finished ink pathways, complicated production steps and low production yield. However, due to the deficient bonding strength between the substrate having provided ink-discharging pressuregenerating elements thereon and the ink pathway walls made from a cured film of a photosensitive resin, when a photosensitive resin film is employed as the covering over said ink pathway walls, the covering made of the photosensitive resin shrinks on curing, whereby the ink pathway walls are drawn toward the direction of shrinkage of the covering until they are peeled off from the substrate. Even when the bonding strength between the ink pathway walls and the substrate is sufficient, there may be still involved the drawback that the ink pathway walls are drawn toward the shrinking direction of the covering to modify the shape of the ink pathway somewhat is desired. Further, when a cold-setting adhesive, a hermosetting adhesive or a photosetting adhesive is employed for provision of a covering over the ink pathway walls, together with the drawback that the adhesive may flow into the ink pathways to clog it to lower markedly the production yield, there may also be involved the drawback that, due to the difference between the wettability of said pathway to ink and that of the covering, such adhesives affect on the precision of the shot spots of the ink droplets or on the response frequency.

SUMMARY OF THE INVENTION

An object of the present invention is to provide an ink jet recording head which is precise and also highly reliable.

Another object of the present invention is to provide an ink jet recording head having a constitution with ink pathways minutely worked faithfully to the design with good precision.

A further object of the present invention is to provide an ink jet recording head which is excellent in use durability as well as in dimensional stability and also free from peeling-off between the substrate and pathway walls.

Still another object of the present invention is to provide an ink jet recording head which is precise in the shot spots of ink droplets and is high in response frequency.

According to the present invention, there is provided an ink jet recording head, comprising a substrate, and a cured film of a photosensitive resin for the formation of ink pathways and a covering over said pathways wherein said covering comprises a flat plate made of a UV-light transmitting material having a photosensitive resin film adhered on both surfaces thereof.

DESCRIPTION OF THE PREFERRED EMBODIMENT

Figure 1:
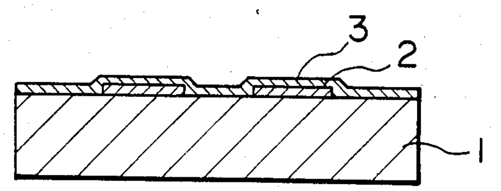
FIGS. 1 through 7 are drawings for illustration of serial steps for preparation of the ink jet recording head of the present invention.

Referring now to the drawings, the embodiments of this invention are to be described.

In the step shown in FIG. 1, ink discharging pressure generating elements 2 such as heat generating elements or piezo elements are arranged in a desired number on a substrate 1 such as of glass, ceramic, plastic or metal, and further, if desired, for the purpose of imparting ink resistance, electrical insulation, etc., there may be coated a thin film 3 such as of $SiO_2$, $Ta_2O_5$, glass, etc. To the ink discharging pressure generating elements 2 are connected electrodes for the input of signals, although not shown in the drawing.

Figure 2:
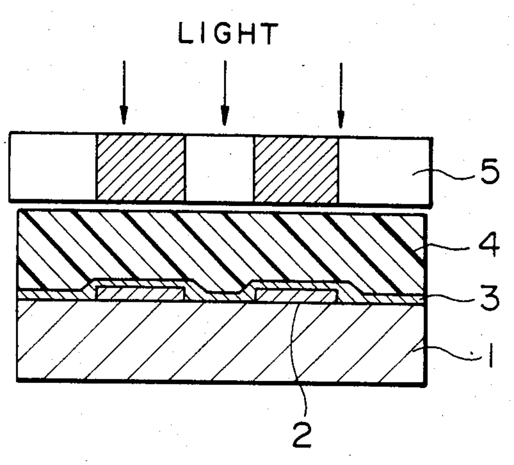

In the subsequent step shown in FIG. 2, the surface of the thin film 3 on the substrate 1 obtained following the step as shown in FIG. 1 is cleaned and dried, followed by lamination of a dry film photoresist 4 (film thickness: about 25μ to 100μ) heated to about 80° to 105 ° C. superposed on the thin film layer 3 at a speed of 0.5 to 4 ft/min. under a pressure of 1 to 3 $Kg/cm^2$. By such an operation, the dry film photoresist 4 is fused to the thin film layer 3. As the next step, after a photomask 5 having a desired pattern is superposed on the dry film photoresist 4 provided on the substrate surface, the photoresist is exposed to light through the photomask 5 as shown in FIG. 2. In this step, the position of the ink discharging pressure generating element 2 has to be adjusted precisely in correspondence to the position of the above pattern, in a conventional manner.

Figure 3:
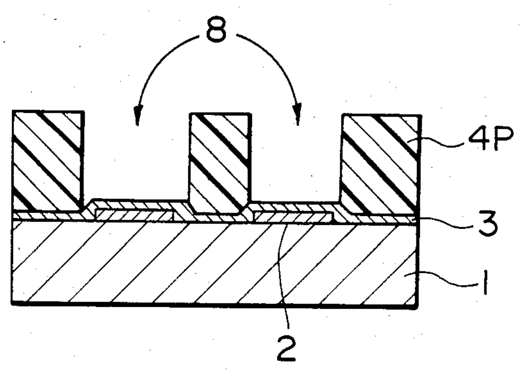

FIG. 3 is a drawing for illustration of the step in which the unexposed portion of the above exposed dry film photoresist 4 is removed by dissolution with a developer comprising a certain organic solvent such as trichloroethane. Then, for improvement of ink resistance of the exposed portion 4P of the dry film photoresist remaining on the substrate 1, heat-curing treatment (for example, by heating at 150° to 250 ° C. for 30 minutes to 6 hours) or UV-ray irradiation (for example at a UV-ray intensity of 50 to 200 $mw/cm^2$ or higher) is applied thereon to make the curing reaction to proceed sufficiently. It is also effective to apply both the above heat curing and UV-ray curing.

Figure 4:
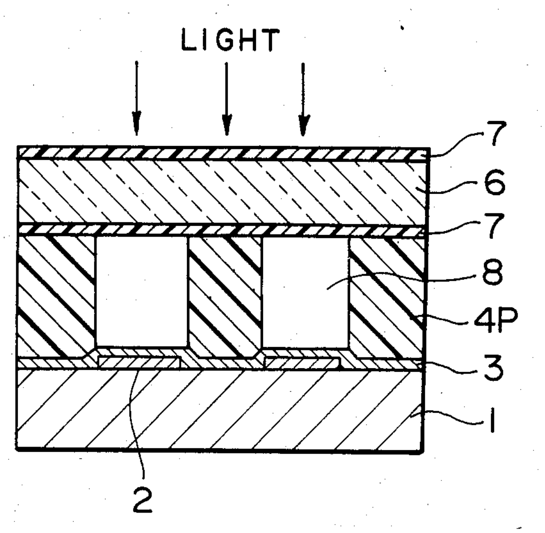

In FIG. 4, a flat plate 6 comprising a material transmissive to UV-rays (e.g., glass) having photosensitive resin films (dry films) 7 laminated on both surfaces thereof is stuck to the pathway walls 4P as the covering over the ink pathways on the substrate 1 having grooves 8 for ink pathways formed by the dry film photoresist 4P which has been completely polymerized and hardened. Then, UV-ray irradiation (e.g., at UV-ray intensity of 50 to 200 $mw/cm^2$ or higher) is applied to the dry films 7 laminated on the flat plate 6 to sufficiently cure the dry films 7. Further additional heat-curing (for example at 130° to 250 ° C. for 30 minutes to 6 hours) may also be effective.

As the material for the flat plate 6 as the covering over the ink pathways, there may be employed any material which is transmissive to UV-rays of effective wavelengths for photopolymerization of a photosensitive resin for forming the ink pathway walls and which is not readily deformed by the shrinking stress of the photosensitive resin. However, in view of convenience in production and economy, glass, epoxy resins, acrylic resins, vinyl resins and the like are recommended.

The dry films 7 are required to stick to both surfaces of the flat plate 6. If only one surface of the flat plate 6 is closely contacted with the dry film, especially on the side of the ink pathway walls, adhesion between the covering and the ink pathway walls may be increased, but the shrinking stress resulting from the polymerization solidification of the dry film acts on the flat plate to create a stress to warp the whole covering, leading to the peeling-off of the ink pathway walls from the substrate. Therefore, it is necessary to have a dry film 7 closely contacted also on the opposite surface of the flat plate 6 so as to compensate the shrinking force for each other. The degrees of photopolymerization of the dry film by UV-ray irradiation at the top surface and at the under surface will generally differ from each other and therefore it is desirable to select the thicknesses and materials of these two dry films so as to compensate these two shrinking forces successfully.

Figure 5:
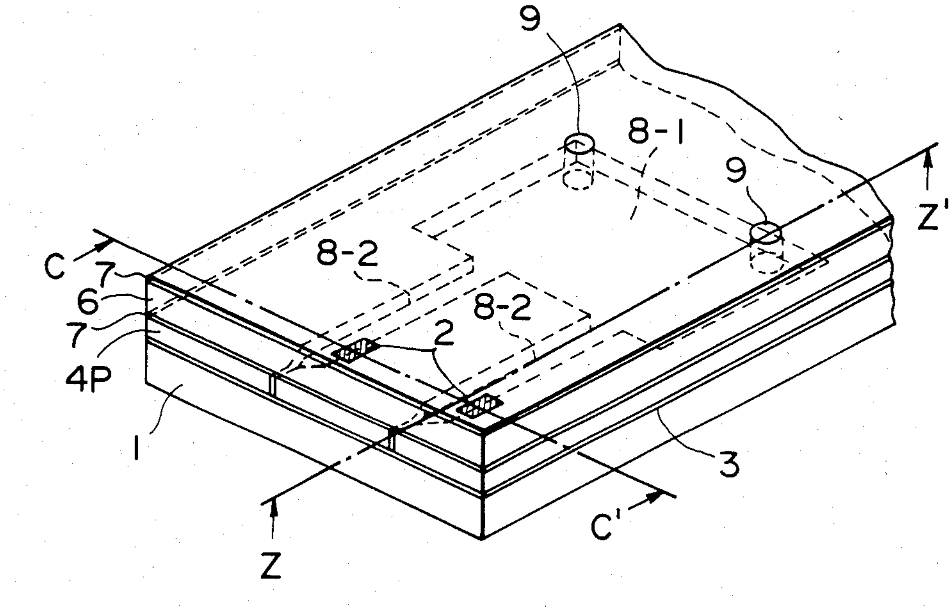

FIG. 5 shows a schematic perspective view of the head appearance after completion of the step shown in FIG. 4. In FIG. 5, 8-1 is an ink supplying chamber, 8-2 narrow ink-flow pathways and 9 through-holes for connection of the ink supplying tubes (not shown in the drawing) to the ink supplying chamber 8-1.

As described above, after completion of the bonding between the substrate having grooves and the flat plate, the front portion of the resulting head is cut along the line C-C′ shown in FIG. 5. This is done for optimizing the distance between the ink discharging pressure generating element 2 and the ink discharing outlet 8-3 in the narrow ink-flow pathways 8-2, and the region to be cut may be determined suitably as desired. For this cutting, there may be employed the dicing method conventionally used in the semiconductor industries.

Figure 6:
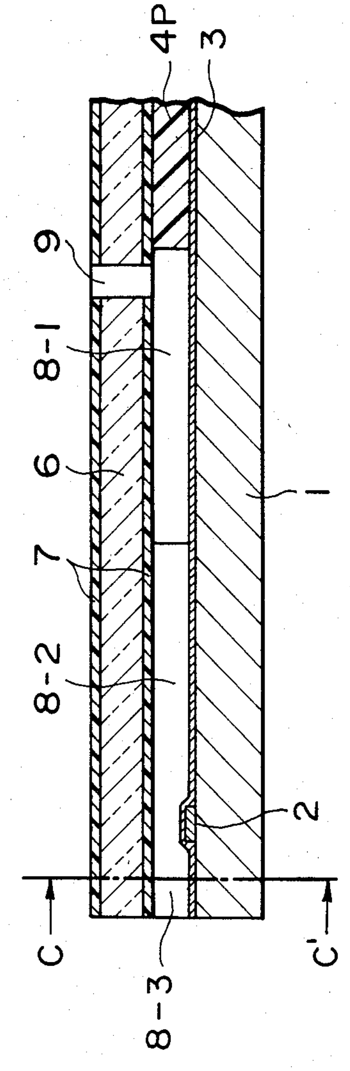
Figure 7:
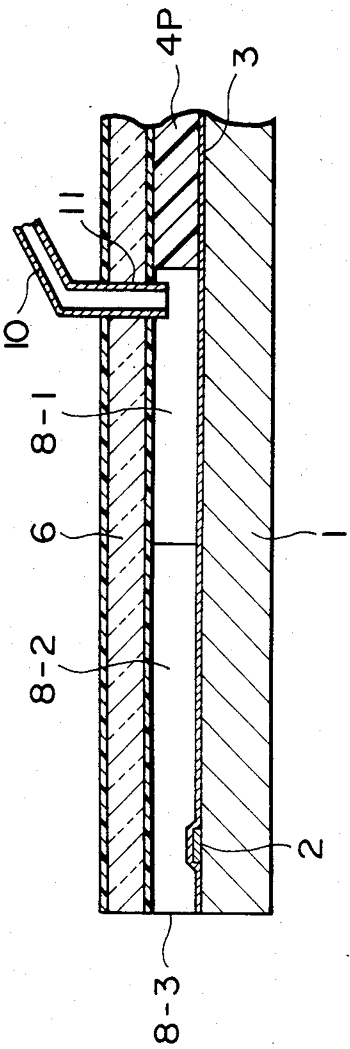

FIG. 6 is a sectional view taken along the line Z-Z′ in FIG. 5. And, the cut face is polished to be smooth and the ink supplying tubes are mounted onto the holes 9 to complete the ink jet recording head (FIG. 7).

In the embodiments shown in the drawings described above, as the photosensitive composition (photoresist) for preparation of the grooves and the films on the covering of the ink pathways, there has been employed the dry film type, namely a solid, to which, however, the present invention is not limited, but a liquid photosensitive composition may also be available.

As a method for forming the coating film of this photosensitive composition, there may be employed, in case of a liquid photosensitive composition, the method utilizing a squeegee used in preparation of a relief image, namely the method in which a wall with a height corresponding to the desired film thickness of the photosensitive composition is placed around the substrate and the excess of composition is removed by means of a squeegee. Here, the photosensitive composition may preferably have a viscosity of from 100 cp to 300 cp. The height of the wall to be placed around the substrate is determined taking into account of vaporization of the solvent component of the photosensitive composition.

On the other hand, in case of a solid photosensitive composition, it is laminated onto the substrate by heat pressing. In the present invention, it is advantageous to utilize a solid film type of photosensitive composition for preparation of grooves or adhesion to a substrate from the standpoint of handling as well as easy and precise control of the thickness. As such solid materials, there may be mentioned photosensitive resins commercially available under the trade names of Permanent Photopolymer Coating RISTON, Solder Mask 730S, 740S, 730FR, 740FR and SM1, produced by Du Pont Co. and Photec SR-1000, SR-2000 and SR-3000, produced by Hitachi Kasei Co. In addition, as the photosensitive composition to be used in the present invention, there may also be mentioned a number of photosensitive compositions employed in the field of photolithography in general such as photosensitive resins, photoresists, etc. These photosensitive compositions may include, for example, diazo resins, p-diazoquinones and further photopolymerizable type materials such as those employing vinyl monomers and polymerization initiators, dimerization type photopolymers employing polyvinyl cinnamate, etc. with sensitizers, mixtures of o-naphthoquinone diazide and novolac type phenol resins, mixtures of polyvinyl alcohol and diazo resins, polyether type photopolymers obtained by copolymerizing 4-glycidylethylene oxide with benzophenone or glycidylcalcone, a copolymer of N,N-dimethyl-methacrylamide with benzophenone, unsaturated polyester type photosensitive resins [e.g., APR (Asahi Kasei), Tevista (Teijin), Sonne (Kansai Paint), etc.], unsaturated urethane oligomer type photosensitive resins, photosensitive compositions comprising mixtures of bi-functional acrylic monomers with photopolymerization initiators and polymers, dichromate type photoresist, non-chromium type water soluble photoresist, polyvinyl cinnamate type photoresist, cyclized rubber-azide type photoresist, etc.

The photosensitive material for the ink pathway covering and the ink pathways should be preferably the same, but not necessarily.

As described above in detail, the present invention has the effects as enumerated below.

1. The principal step for preparation of the ink jet recording head uses the so-called photolithographic technique, whereby the minute head portion with a desired pattern can be formed very easily. Moreover, a number of heads with the same constitution and the same performance can be worked simultaneously.

2. Since no adhesive is used between the substrate and the ink pathway walls and between the ink pathway walls and its covering, no such inconvenience is caused as malfunction through clogging of the ink pathwaysby the adhesive or sticking of ink on the discharging pressure generating element.

3. The compensation of the cure-shrinking forces of the two photosensitive resin films on the flat plate removes the internal stress within the head, so that any peeling-off, deformation or displacement of the constituting members does not occur, resulting in the very durable ink jet head of long life.

4. Since the flat plate and the photosensitive resin films for the covering over the flow pathways are light transmissible, the movement of the ink droplets within the ink jet head can be visually observed to afford easy maintenance of the head.

What we claim is:

1. An ink jet recording head, comprising a substrate, and a cured film of a photosensitive resin defining ink pathways and a covering over said pathways wherein said covering comprises a flat plate made of a UV-light transmitting material having respective cured films of photosensitive resin adhered on both surfaces thereof.

2. An ink jet recording head according to claim 1, wherein said cured films of said covering are of dry film type photosensitive resin.

3. An ink jet recording head according to claim 1, further comprising ink discharging pressure generating elements placed on said substrate.

4. An ink jet recording head accordng to claim 1, wherein said respective cured films of said covering have different thicknesses from each other.

5. An ink jet recording head according to claim 1, wherein said cured films of said covering are of different photosensitive resins from each other.

6. An ink jet recordng head according to claim 1, wherein said cured films of said covering are of the same photosensitive resin.

* * * * *

UNITED STATES PATENT AND TRADEMARK OFFICE
CERTIFICATE OF CORRECTION

PATENT NO. : 4,521,787
DATED : June 4, 1985
INVENTOR(S) : MASAMI YOKOTA, ET AL.

It is certified that error appears in the above-identified patent and that said Letters Patent is hereby corrected as shown below:

Column 1, line 24, change "lhe" to --the--;
line 58, change "pressuregenerating" to --pressure generating--.

Column 2, line 2, change "somewhat" to --from what--;
line 3, change "her-" to --ther---.

Column 3, line 14, insert --a-- after "1,".

Column 4, line 4, change "discharing" to --discharging--.

Column 6, line 17, change "accordng" to --according--;
line 23, change "recordng" to --recording--.

Signed and Sealed this

*Fourth* Day of *March 1986*

[SEAL]

*Attest:*

DONALD J. QUIGG

*Attesting Officer* *Commissioner of Patents and Trademarks*